(12) United States Patent
Royer et al.

(10) Patent No.: US 7,941,692 B2
(45) Date of Patent: May 10, 2011

(54) NAND POWER FAIL RECOVERY

(75) Inventors: Robert Royer, Portland, OR (US);
Sanjeev N. Trika, Hillsboro, OR (US);
Rick Coulson, Portland, OR (US);
Robert W. Faber, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 557 days.

(21) Appl. No.: 12/006,280

(22) Filed: Dec. 31, 2007

(65) Prior Publication Data
US 2009/0172466 A1    Jul. 2, 2009

(51) Int. Cl.
*G06F 11/00* (2006.01)

(52) U.S. Cl. .................. 714/5; 714/6; 714/42; 711/103
(58) Field of Classification Search .................. 714/5, 6, 714/42; 711/103
See application file for complete search history.

(56) References Cited

U.S. PATENT DOCUMENTS

| | | | |
|---|---|---|---|
| 7,516,267 B2 * | 4/2009 | Coulson et al. ............... 711/103 |
| 2008/0301397 A1 * | 12/2008 | Goh et al. ...................... 711/202 |
| 2009/0055680 A1 * | 2/2009 | Honda et al. ...................... 714/5 |
| 2009/0259919 A1 * | 10/2009 | Kilzer et al. ................... 714/773 |

* cited by examiner

*Primary Examiner* — Philip Guyton
(74) *Attorney, Agent, or Firm* — Caven & Aghevli LLC

(57) ABSTRACT

Techniques to recover data from an indirected non-volatile memory system after unexpected power failure, as, e.g., NAND memory in electronic devices are disclosed.

15 Claims, 4 Drawing Sheets

| Physical Address Index 202 | Data 204 | Metadata 206 | | | | | |
|---|---|---|---|---|---|---|---|
| | | Cache Metadata 208 | | | | Logical Address 218 | Consumption State 220 |
| | | Tag = Disk LBA 212 | Valid 214 | Dirty 216 | ... | | |
| 222(1) 1 | | | | | | None | Used |
| 222(2) 2 | | | | | | 2 | Valid |
| 222(3) 3 | | | | | | 4 | Valid |
| 222(4) 4 | | | | | | 3 | Valid |
| 222(5) 5 | | | | | | None | Used |
| 222(6) 6 | | | | | | 5 | Valid |
| 222(7) 7 | | | | | | None | Used |
| 222(8) 8 | | | | | | 1 | Valid |
| 222(9) 9 | | | | | | 6 | Valid |
| 222(10) 10 | | | | | | None | Blank |
| 222(11) 11 | | | | | | None | Blank |
| 222(12) 12 | | | | | | None | Blank |

224

| Logical Address Index 230 | Physical Address 232 |
|---|---|
| 234(1) 1 | 21 |
| 234(2) 2 | 22 |
| 234(3) 3 | 23 |
| 234(4) 4 | 24 |
| 234(5) 5 | 25 |
| 234(6) 6 | 26 |

226

| Physical Address Index 236 | Consumption State 238 |
|---|---|
| 240(1) 1 | Blank |
| 240(2) 2 | Blank |
| 240(3) 3 | Blank |

NAND POWER FAIL RECOVERY

RELATED APPLICATIONS

This application is related to the following applications: U.S. Patent Application Ser. No. 10/739,608, to Royer, et al., filed Dec. 8, 2003, entitled VIRTUAL CACHE FOR DISK CACHE INSERTION AND EVICTION POLICIES AND RECOVERY FROM DEVICE ERRORS; U.S. Patent Application Ser. No. 11/254,508, to Trika, et al., filed Oct. 20, 2005, entitled METHOD TO ENABLE FAST DISK CACHING AND EFFICIENT OPERATIONS ON SOLID STATE DISKS.

BACKGROUND

Computer systems store data to different types of storage media and devices. Such storage media and devices may be considered nonvolatile, and persistently store data when power to a computer system is turned off. An example of a nonvolatile storage device is a hard disk of a computer system. Storage devices may also include NAND flash memory and solid state disks (SSD). Storage media may include actual discs or platters that are accessed through the storage device. An operating system (OS) executing on a processor may request or perform actions, such as read and write, to particular locations on a storage medium.

Data written to and read from locations in these particular storage devices may be structured in blocks. Bits representing digital information (i.e., 1 or 0) may be grouped as data. In the storage devices, the bits may be stored in cells. Cells may be organized into pages. Therefore, a page is representative of the data. The size of a page typically is about 2,048 bytes for NAND flash memories; however, this is not typical for hard disk drives (HDD). In certain instances, the page may be a different size.

In some non-volatile memories, such as NAND-Flash, pages may be placed into erase blocks. An erase block typically includes about 64 pages, although in certain instances, an erase block may include a different number of pages. In such memories, it is typically required that all pages in a given erase block be erased together rather than individually.

Furthermore, in non-volatile memories such as NAND flash memory, it is typically required that pages are erased before they are written. Erased pages are also sometimes referred to as "blank" or "blank pages". Thus, only blank pages can be written to. To write to the same page twice, the page is erased after the first write and before the second write. An exception to this rule is that bits in a written page may be toggled from "1" to "0" without an intermediate erase.

When an action such as a write is performed on a page of a storage device or storage medium, the entire erase block containing that page is first read into a temporary location, then the erase block is erased, and all the data is rewritten to the blank pages in the erase block, including the data from the temporary buffer for all but the requested page write, and the new data for the requested page write. Thus, a page write typically requires read, erase, and write operations on the entire erase block containing the page, which is relatively quite slow. The temporary locations may be in volatile memory of the computer system.

The number of erase cycles performed on erase blocks of memory like NAND flash memory may be limited. Typically, it is recommended that such erase actions are performed for no more than 100,000 cycles for each erase block.

Thus, in addition to degradation issues seen at erase blocks from multiple erase cycles, performance issues also exist when performing actions affecting entire erase blocks. Moving pages to and from erase blocks and temporary locations involves significant input/output (IO) traffic in a computer system and uses considerable processor (i.e., controller) resources.

BRIEF DESCRIPTION OF THE DRAWINGS

The detailed description is described with reference to the accompanying figures, in which.

DETAILED DESCRIPTION

Described herein are exemplary systems and methods for implementing NAND power fail recovery which may be implemented in an electronic device such as, e.g., a computer system. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
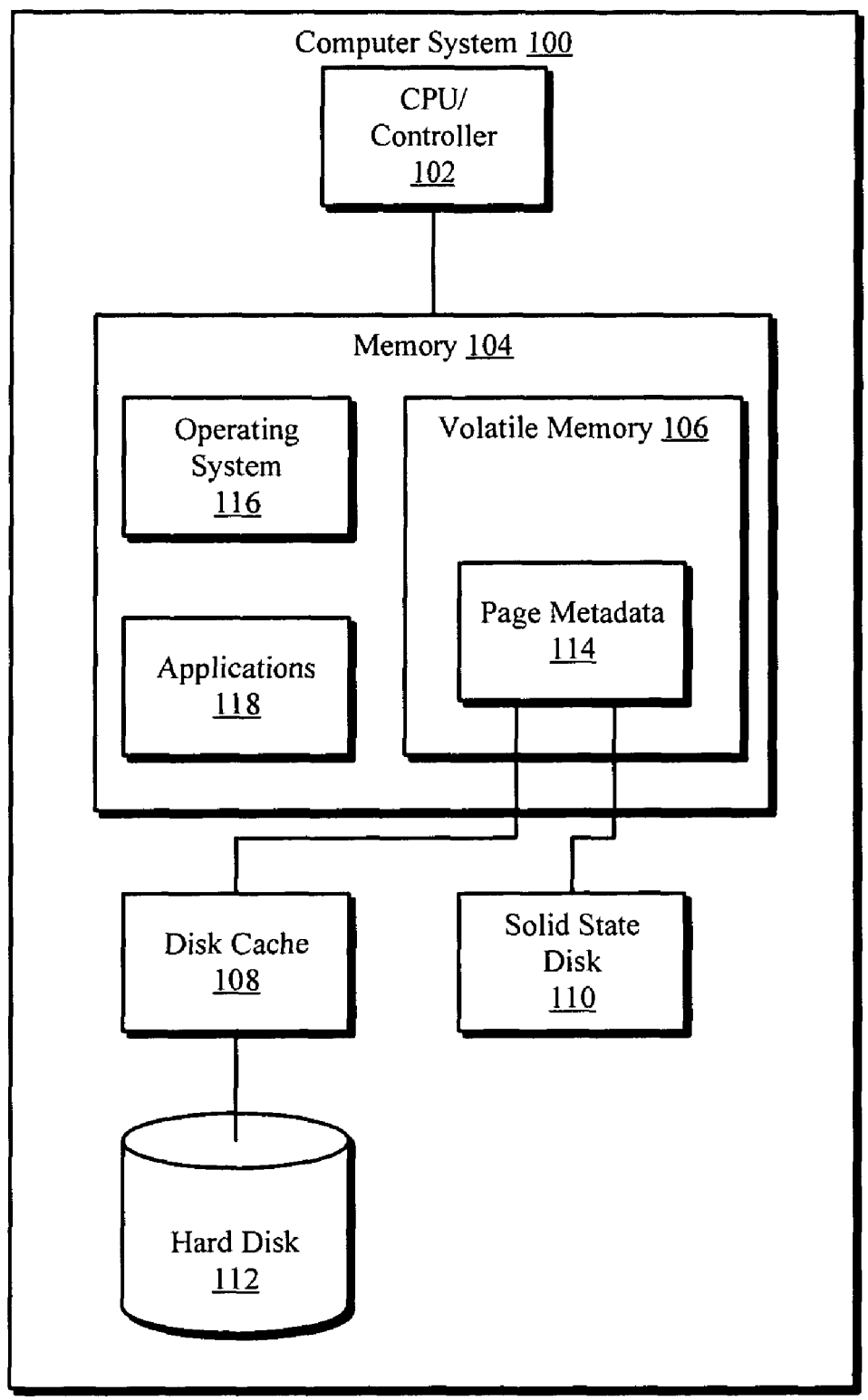
FIG. 1 is a schematic illustration of a computer system that may be adapted to implement NAND error management, according to some embodiments.

FIG. 1 illustrates a computer system 100 that provides a disk cache and/or a solid state disk (SSD). Computer system 100 includes one of various devices and systems such as personal computers (PC), laptop computers, and server computers. Computer system 100 may be particularly configured to perform fast or efficient caching (i.e., more efficient operations on storage media) to a storage device or hard disk drive implementing a disk cache. Alternatively, computer system 100 may be configured to include a solid-state drive (SSD) implemented as specified in this application. The particular computer system 100 that is illustrated shows both a disk cache and an SSD. It is contemplated that particular implementations of computer system 100 may have only a disk cache or an SSD, and in certain cases (as illustrated here) both a disk cache and an SSD are implemented. Examples of storage devices include NAND flash memory, NOR flash memory, polymer memory, or any other non-volatile memory organized in erase blocks containing memory pages.

Computer system 100 includes a central processing unit (CPU) or controller 102. In certain embodiments, controller 102 is a dual or multiple processor that includes multiple controllers. Controller 102 may be used for various processes in computer system 100, and particularly may include a memory and disk controller.

A memory 104 is included in computer system 100. The memory 104 is controlled by the controller 102. The memory 104 may include one or more memories such as random access memory (RAM). Memory 104 may include volatile and nonvolatile memory wherein data is lost in volatile memory and data is not lost in nonvolatile memory when computer system 100 is turned off. In this example, memory 104 particularly includes a volatile memory 106. Volatile memory 106 may be dynamic random access memory (DRAM).

Alternatively, the volatile memory 106 may reside in a disk cache 108, or a SSD 110, rather than separate from the disk cache 108 and/or SSD 110. Furthermore, a controller (not shown) may reside inside the disk cache 108 or the SSD 110, or a hard disk drive (HDD) 112. The resident controller particularly controls the volatile and non-volatile memory accesses. In addition, the disk cache 108 may be on a separate bus rather than connected as a filter as shown in the FIG. 1. In particular implementations, disk cache 108 resides in HDD 112.

In this example, volatile memory 106 stores page metadata 114. The page metadata 114 includes consumption state information of the pages (i.e., pages identified by specific physical addresses). The consumption state information includes three states: used, valid, and blank. As further described below, the use of consumption state information allows actions on individual pages to be performed, thereby avoiding the need to erase entire blocks. This enables fast disk caching and solid-state-disk operation by performing actions on individual pages instead of entire erase blocks.

Memory 104 may store an operating system 116 executable by controller 102. Application programs or applications 118 may be stored in memory 104. Applications 118 are run by operating system 116. Operating system 116 is particularly used to perform read and write operations to volatile memory 106 and a storage device such as hard disk 112 and/or SSD 110. Such operations may be performed as a result from requests from applications 118.

Disk cache 108 is included in computer system 100. In implementations where a memory device such as an SSD 110 is used in place of HDD 112, similar logic or processes as performed by disk cache 118 is performed by SSD 110. Data sent to memory 104 (i.e., operating system 116 or applications 118) from HDD 112, goes through disk cache 108 and/or SSD 110.

Disk cache 108 is particularly used for actions performed on HDD 112. For example, a read request is performed by operating system 116. If the data is found in the disk cache 108, the data is sent from disk cache 108 to the operating system 116. If the data is not found in disk cache 108, the data is read from the HDD 112.

If a write action is performed by operating system 116, the data is sent to disk cache 108 and/or to the HDD 112 depending on disk caching logic. During times when the operating system 116 is not active, the data may be sent from the disk cache 108 to the HDD 112.

Information in page metadata 114 includes information as to state of individual pages, and a logical to physical address mapping table, that allows faster disk caching and SSD 110 operations (i.e., more efficient operations) by permitting operations to single pages rather than multiple actions on entire blocks (i.e., erase blocks).

Figures 2A, 2B:
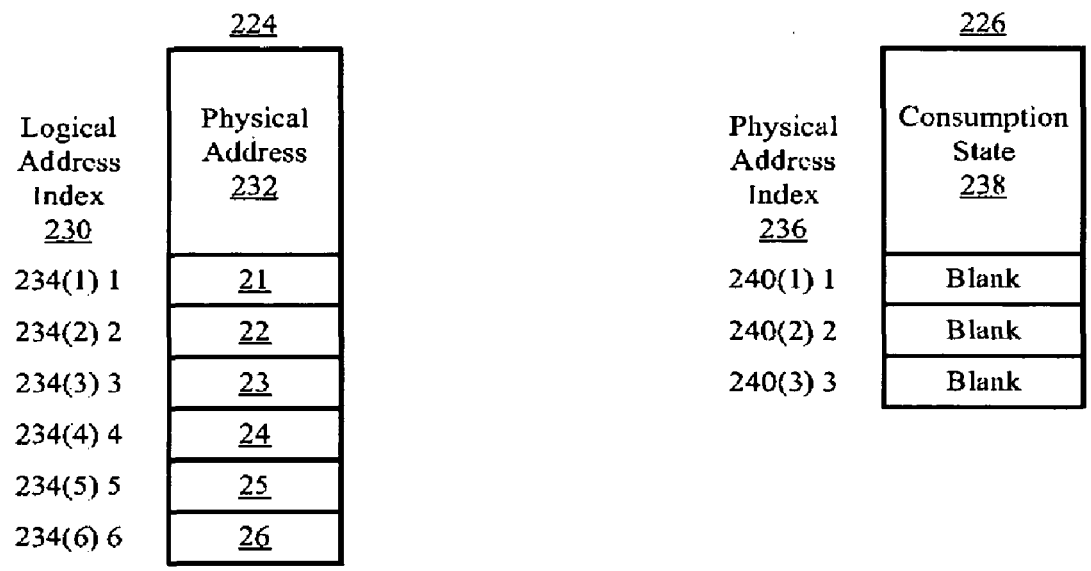
FIG. 2A is a block diagram of page metadata information included in nonvolatile memory of such a disk cache or solid state disk, according to some embodiments.
FIG. 2B is a block diagram of page metadata information included in volatile memory for controlling such a disk cache or solid state disk, according to some embodiments.

FIG. 2A illustrates layout of data and page metadata in nonvolatile memory such as disk cache 108 or solid state disk (SSD) 110. In particular, table 200 supports what is described as dynamic addressing of nonvolatile memory on a disk cache 108 or a SSD 110. The dynamic addressing continually changes the mapping between the logical addresses and physical addresses to ensure that each logical write operation causes data to be stored in a previously erased location (i.e., at a different physical address) of the nonvolatile memory. Thus, with dynamic addressing, each logical write operation produces a single operation on a page. This is to be compared to typical addressing that use three accesses to the containing erase block of a nonvolatile memory (one to read the data at the erase block containing the specified address, one to erase/invalidate an old erase block, and the third to write the updated data at the erase block).

Table 200 includes a physical address index 202 which indexes a physical address of a physical location in a storage medium or storage device, such as included in disk cache 108 or SSD 110. Table 200 particularly does not include a physical addresses, but accesses physical addresses through physical address index 202. An index points to a physical address, where a physical address defines a particular page in a particular erase block where data is stored.

Table 200 includes a field for data 204 which represents actual data. Table 200 further includes metadata as represented by metadata field 206. Metadata field may include a field cache metadata 208 that describes metadata used by disk cache 108; however, this field may be not required for SSD 110 operation. Included in cache metadata 208 are sub-fields directed to typical prior art cache metadata or application specific metadata, as represented in the following exemplary fields: tag=disk LBA (logical block address) field 212, valid bit field 214, dirty bit field 216, etc. It is well known in the art to include such information or application specific metadata.

A logical address field 218 and a consumption state field 220 are provided in order to allow fast disk caching or efficient SSD operations on storage media. The logical address field 218 represents an address to which the operating system 110, disk cache 118, or logic in an SSD 116 may go for data. In particular, algorithms in disk cache 118 or in SSD 116 refer to logical addresses as defined by the field for logical address 218, in performing the actions to and from the disk cache 108 or SSD 110. The consumption state field 220 represents one of three consumption states of a page. A first consumption state is "blank", which indicates that data can be written to the page. A second consumption state is "valid", which indicates that data is present in the page and may be read. A third consumption state is "used", which indicates that data is present in the page, but it is no longer valid or may not be read. Pages identified as "used" are pages which can be erased. By providing consumption state information for pages, actions (e.g., write or erase) can be performed on pages without having to move previously stored user data.

In this example, table 200 includes twelve data entries 222(1) to 222(12) that occupy physical pages 1 to 12, and are indexed by physical address index 202. In specific, data entry 222(1) is indexed by physical address index 1; data entry 222(2) is indexed by physical address index 2; data entry 222(3) is indexed by physical address index 3; and so on.

The pages as defined by their physical address indices may be grouped in erase blocks. For example, pages as defined by indices 1, 2, 3, and 4 are grouped in an erase block 1; pages as defined by indices 5, 6, 7, and 8 are grouped in an erase block 2; and pages as defined by indices addresses 9, 10, 11, and 12 are grouped in an erase block 3. The number of pages and their grouping are for illustration, and it is expected that typical erase blocks will include more than four pages, and that the disk cache 108 and the SSD 110 will include more than three erase blocks Disk cache 108 or SSD 110 may have a limitation as to a maximum number of logical pages they may address. For example, in this illustration, the maximum may be 6 pages. Therefore, 6 pages in entries 222 can have a consumption state of "valid". In this example, such entries are entry 222(2), entry 222(3), entry 222(4), entry 222(6), entry 222(8) and entry 222(9). The other entries of entries 222 are either "used" or "blank".

FIG. 2B illustrates page metadata information in volatile memory such as volatile memory 106. In particular, a logical address to physical address (L2P) table 224, and a blank pool table 226 may be stored in volatile memory 106.

L2P table 224 includes a logical address index field 230 and a physical address field 232. Logical address index field 230 particularly provides an index to a logical address; however, L2P table 224 does not include a logical address. Entries 234 include indexes to logical addresses and corresponding physical addresses.

Blank pool table 226 includes a physical address index field 236 and a consumption state field 238. It is contemplated that for typical implementations, blank pool 236 does not include consumption state field 238, since only physical addresses having a consumption state of "blank" need be identified in blank pool table 226. In other words, the blank pool table 226 is simply a list of physical addresses for which the consumption state is blank in table 220. Each entry of entries 240 include physical addresses (i.e., indices to physical addresses) having a consumption state of "blank". By identifying available or blank pages, the disk cache 108 or SSD 110 logic can write to particular blank pages. In certain implementations, table 200 may also be included in volatile memory without the data 204 field. In volatile memory, table 200 allows relatively fast and more efficient identification of erase blocks that are mostly empty and required table lookup logic to update the page metadata on relocations.

Since information in table 200 is stored in nonvolatile memory (i.e., disk cache 108 and/or SSD 110), in the event that data is corrupted, erased, or made unavailable (i.e., not kept after power down) in volatile memory 106, data in tables 224 and 226 may be created or recreated using data from table 200. This enables, for example, power-failure recovery for both the disk-caching and the solid-state disk applications despite constantly changing logical-to-physical address mapping, and maintenance of the L2P table 224 in volatile memory.

Storage is one of the biggest performance bottlenecks in computer systems. In some embodiments, a computer system 100 may implement write-back disk-caching on non-volatile memory to significantly alleviate the performance bottleneck, while at the same time offering power-savings benefits, critical especially for mobile platforms. Solid State Disks offer similar benefits. The related applications incorporated by reference above implement algorithms for disk cache and SSD applications on non-volatile (NV) memories such as NAND flash that have high write latencies and data organized in pages that must be erased in an erase block (EB) before they can be written again. These algorithms have the following a characteristics: a) An indirection table L2P is used to map logical addresses to physical page address, b) Writes to a logical address is written to a blank physical page, and the L2P is updated to point to this page, c) At idle times, valid pages in an erase block are relocated to another erase block before erasing the first block, and d) For each write to a logical address, a sequence number is saved in page metadata to enable identification of the current (most recent) write for the logical address. This is required for proper power-fail recovery.

These methods, however, assume that the underlying solid-state non-volatile memory does not have any errors during read, write and erase operations. In practice, errors occur during read, write, and erase operations periodically and need to be managed without destroying data integrity whenever possible in order to maintain reliable operation. During power-fail recovery, each physical page is read (first the metadata, and later if necessary, its data), in order to recover the L2P state. Thus, described herein are embodiments of techniques to recover from NAND errors in a computer system such as the computer system 100.

The key components of this invention are the handling of each type of error that can be detected during this rebuild operation. These components are described, one per row, in the Table 1. Table 1 describes the NAND page states possible per page after an unexpected power failure, and the recovery action the system must take to properly recover the disk-cache or SSD state.

TABLE 1

| Page State | Description | Recovery Action |
|---|---|---|
| Blank | Page is identified as Blank by HW during a read operation. Page contains no user data. Note, however, that the page may not be fully erased due to power failure during an erase operation | Page is not considered during L2P table rebuild [2], but the page is erased before any new data may be written to it. |
| Non-blank, with no ECC errors or corrections in metadata | This is the typical page state for pages with current or stale user data. | Page is considered during L2P table rebuild. Data sectors may have ECC correction or failures. If ECC errors are detected, EB containing this page is placed in a Grown Defect Map (GDM) [3], once all Current user data has been moved out of the EB. |
| Non-blank, and metadata has ECC errors | Metadata is corrupted and page state cannot be determined. This is due to either an ECC error in metadata or a power failure during an erase or program operation. | Page state can not be determined, and the page is not considered during the L2P table rebuild. The page's EB is not placed on the GDM. |
| Metadata has ECC corrects AND Read of data sectors has ECC errors | Page does not contain valid user data. Because we have ECC failures in the data, the corrections in the metadata are most likely mis-corrects and indicate that the whole page has a massive number of bit failures. This type of failure is indicative of power failure occurred during a program or | Page state as identified by the metadata cannot be trusted, and therefore the page is not considered during L2P rebuild. The page's EB is not placed on the Grown Defect Map |

TABLE 1-continued

| Page State | Description | Recovery Action |
|---|---|---|
| | erase. | |
| Metadata has ECC corrects AND Read of data identifies that more than half of the data sectors have ECC corrects | Page does not contain valid user data. Because we corrected bit errors in most of the data sectors, and in the metadata, these corrections are most likely mis-corrects and indicate that the whole page has a massive number of bit failures. This type of failure is indicative of power failure occurred during a program or erase | Page state as identified by the metadata cannot be trusted, and therefore the page is not considered during L2P rebuild. The page's EB is not placed on the Grown Defect Map |
| Metadata has ECC corrects AND Read of data sectors identifies less than half have ECC corrects | Page is ok and may contain user data, since only half the sectors contain corrects, it is likely that there are no mis-corrects and the data contained in the page is good. | Page should be considered during L2P rebuild. The page's EB should be placed on the GDM once all Current user data has been moved out of the EB. |

Exemplary techniques are described with reference to FIGS. 3-4. The methods that are described are illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. The processes are described with reference to computer system 100 and tables 200, 224, and 226 described above. Although described as flow diagrams, it is contemplated that certain processes may take place concurrently or in a different order.

Figure 3:
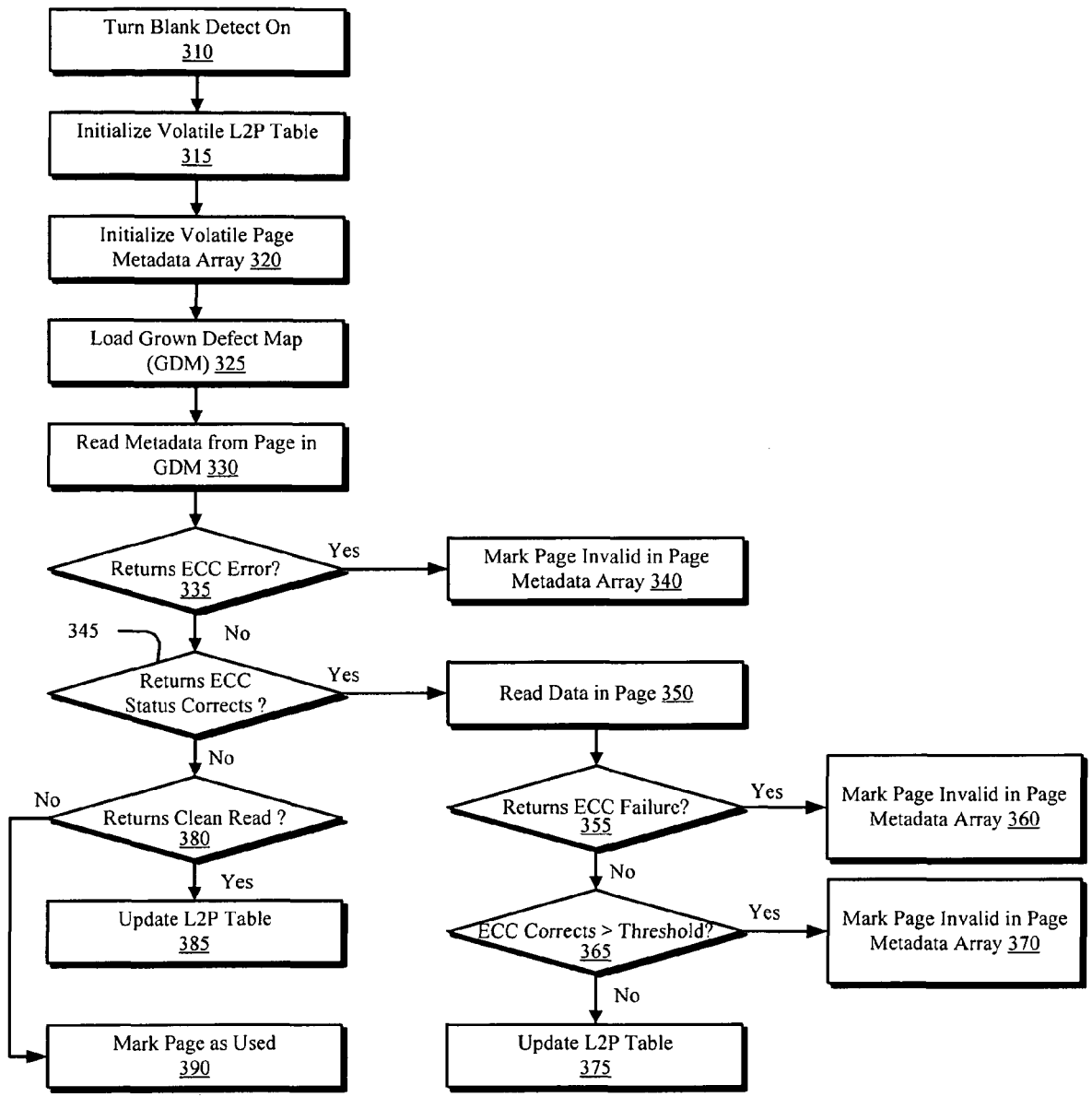
FIG. 3 is a flow diagram illustrating a process for NAND power fail recovery, according to some embodiments.

FIG. 3 is a flow diagram illustrating a process for NAND error recovery, according to some embodiments. In one embodiment, the operations of FIG. 3 may be used to recover packed metadata and indirection tables after a power failure. Referring to FIG. 3, at operation 310, a blank detect function is turned on. At operation 315, a volatile L2P table is initialized such that each entry points to an invalid physical address. At operation 320 a volatile Page Metadata Array (packed metadata) is initialized to indicate each page is defective. At operation 325 a Grown Defect Map (GDM) is loaded from its known primary physical location (or from its backup location in case the primary page reports errors). Operations 330-390 are performed for each page in each erase block (EB) that is not marked as defective in the GDM.

At operation 330 metadata from the page is read (and may be stored in the Page Metadata Array). If, at operation 335, the metadata read returns an ECC error, then control passes to operation 340 and the page is marked as invalid in Page Metadata Array. By contrast, if at operation 335 the metadata read does not return an error, then control passes to operation 345. If, at operation 345 the metadata read return status of ECC corrects, then control passes to operation 350 and a read command is issued to read all the data in this page. If, at operation 355, the read causes an ECC failure, then control passes to operation 360 and the page is marked as invalid in Page Metadata Array. By contrast, if the read does not cause an ECC failure, then control passes to operation 365.

If, at operation 365, the number of ECC corrects exceeds a threshold, (e.g., if the hardware reports data contains ECC Corrects for more than half the sectors in the page), then it is determined that the page does not contain valid data, and control passes to operation 370 and the page is marked as invalid in Page Metadata Array. By contrast, if at operation 365 the ECC corrects do not exceed a threshold, then control passes to operation 375 and the L2P table is updated with the logical address as read from the metadata.

Referring back to operation 345, if the metadata read returns with no ECC corrects, then control passes to operation 380. If, at operation 380 the ECC returns with no failures, then control passes to operation 385 and the L2P table is updated with this physical address, the logical address decoded from the metadata, and associated Metadata, regardless of any ECC failures in the data contained in the page. By contrast, if at operation 380 the ECC returns with a failure, then control passes to operation 390 and the page is marked as used in Page Metadata Array As mentioned above, operations 330-390 are performed for each page in each erase block (EB) that is not marked as defective in the GDM. Once these operations have been completed, the blank detect may be turned off.

Figure 4:
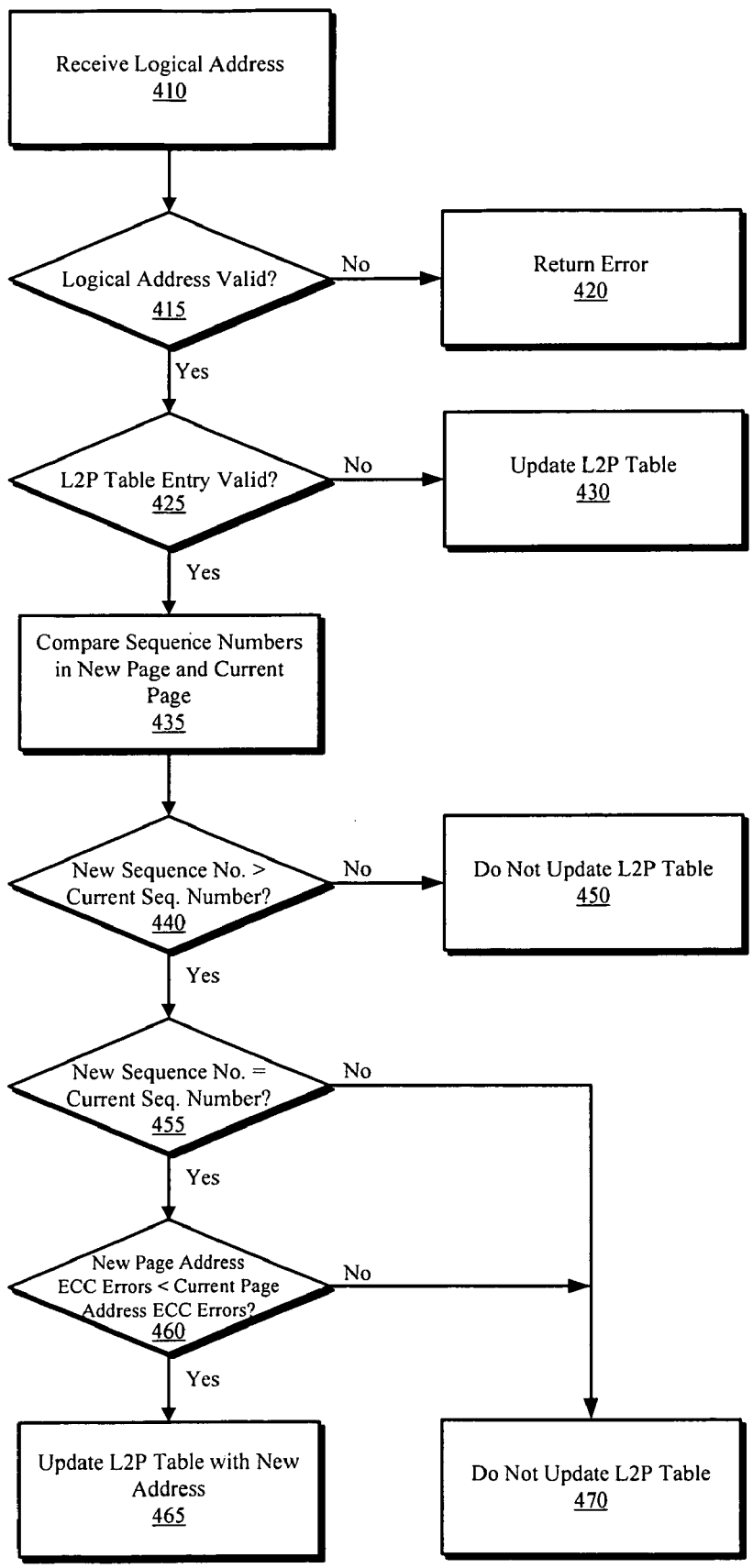
FIG. 4 is a flow diagram illustrating a process for NAND power fail recovery, according to some embodiments.

FIG. 4 is a flow diagram illustrating a process for NAND error recovery, according to some embodiments. In some embodiments, the operations of FIG. 4 may be used to update the L2P table. Referring to FIG. 4, at operation 410 a logical address is received. In some embodiments a Physical address P, Error vector E, and Packed Metadata PM may also be received. If, at operation 415, the logical address is invalid, then control passes to operation 420 and the routine returns an error. By contrast, if at operation 415 the logical address is valid then control passes to operation 425.

If, at operation 425, the L2P table entry is invalid, then control passes to operation 430 and the L2P table is updated. By contrast, if at operation 425 the L2P table entry is valid, then control passes to operation 435 and the sequence numbers in the new page and the current page are compared. If, at operation 440, the new sequence number is greater than the current sequence number, then control passes to operation 450 and the L2P table is not updated.

By contrast, if at operation 440 the new sequence number is not greater than the current sequence number, then control passes to operation 455. If, at operation 455, the new sequence number is equal to the current sequence number and if at operation 460 the new page address has fewer ECC errors or ECC corrects than the current page, then control passes to operation 465 and the L2P table is updated with new page address. Otherwise, control passes to operation 470 and the L2P table is not updated.

The methods depicted herein utilize a unique page level indirection system in which the state of each page within the erase block needs to be determined before the overall state of the erase block can be identified. In addition, the methods reduce write latency, the NAND algorithms do not maintain a dynamically-updating erase block state table stored in NAND. Instead the algorithms encode enough information in the metadata in the NAND page, and from this information the state of the pages and the erase blocks can be determined after a power failure.

The operations of FIG. 3 and FIG. 4 provide a robust algorithm to handle NAND errors without compromising user's data. It also comprehends that a power-failure during an erase or a write operation can leave the NAND page in an indeterminate state, and can properly handle that without marking blocks containing such pages as bad.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to recover the state of data stored in NAND memory after power failure in an electronic device, comprising:
    detecting, during power failure recovery, a page state associated with a NAND page;
    determining whether to include the NAND page in an L2P rebuild operation based at least in part on the page state associated with the NAND page; and
    updating the L2P table with data from the NAND page, by performing operations comprising:
        determining a number of ECC errors or corrections associated with a new page address and the current page address; and
        updating the L2P table when the number of ECC errors or corrections associated with the new page address is less than the number of ECC errors or corrections associated with the current page address.

2. The method of claim 1, wherein detecting a page state comprises detecting whether the NAND page is in a blank state.

3. The method of claim 1, wherein detecting a page state comprises determining whether the NAND page is free of ECC errors.

4. The method of claim 1, wherein detecting a page state comprises determining whether a number of ECC corrections associated with a page exceeds a threshold.

5. The method of claim 1, wherein updating the L2P table comprises:
    determining a number of ECC errors or corrections associated with a new page address and the current page address; and
    bypassing an update on the L2P table when the number of ECC errors or corrections associated with the new page address is greater than the number of ECC errors or corrections associated with the current page address.

6. A system to recover the state of data stored in NAND memory after power failure in an electronic device, comprising logic circuitry to:
    detect, during power failure recovery, a page state associated with a NAND page;
    determine whether to include the NAND page in an L2P rebuild operation based at least in part on the page state associated with the page;
    determine a number of ECC errors or corrections associated with a new page address and the current page address; and
    update the L2P table with data from the NAND page when the number of ECC errors or corrections associated with the new page address is less than the number of ECC errors or corrections associated with the current page address.

7. The system of claim 6, further comprising logic circuitry to detect whether the NAND page is in a blank state.

8. The system of claim 6, further comprising logic circuitry to determine whether the NAND page is free of ECC errors.

9. The system of claim 6, further comprising logic circuitry to determine whether a number of ECC errors associated with a page exceeds a threshold.

10. The system of claim 6, further comprising logic circuitry to:
    determine a number of ECC errors or corrections associated with a new page address and the current page address; and
    bypass an update on the L2P table when the number of ECC errors or corrections associated with the new page address is greater than the number of ECC errors or corrections associated with the current page address.

11. A system to recover the state of data stored in NAND memory after power failure in an electronic device, comprising logic instructions stored on a tangible computer readable medium which, when executed by a processor, configure the processor to:
    detect, during power failure recovery, a page state associated with a NAND page;
    determine whether to include the NAND page in an L2P rebuild operation based at least in part on the page state associated with the page;
    determine a number of ECC errors or corrections associated with a new page address and the current page address; and
    update the L2P table with data from the NAND page when the number of ECC errors or corrections associated with the new page address is less than the number of ECC errors or corrections associated with the current page address.

12. The system of claim 11, further comprising logic instructions stored on a tangible computer readable medium which, when executed by a processor, configure the processor to detect whether the NAND page is in a blank state.

13. The system of claim 11, further comprising logic instructions stored on a tangible computer readable medium which, when executed by a processor, configure the processor to determine whether the NAND page is free of ECC errors.

14. The system of claim 6, further comprising logic instructions stored on a tangible computer readable medium which, when executed by a processor, configure the processor to determine whether a number of ECC errors associated with a page exceeds a threshold.

15. The system of claim 6, further comprising logic instructions stored on a tangible computer readable medium which, when executed by a processor, configure the processor to:
    determine a number of ECC errors or corrections associated with a new page address and the current page address; and
    bypass an update on the L2P table when the number of ECC errors or corrections associated with the new page address is greater than the number of ECC errors or corrections associated with the current page address.

* * * * *